United States Patent
Mathae

(10) Patent No.: US 9,127,751 B2
(45) Date of Patent: Sep. 8, 2015

(54) GEARBOX FOR A TAP CHANGER, A TAP CHANGER AND A TRANSFORMER

(71) Applicant: Jean Mathae, Ludvika (SE)

(72) Inventor: Jean Mathae, Ludvika (SE)

(73) Assignee: ABB Research Ltd. (CH)

( * ) Notice: Subject to any disclaimer, the term of this patent is extended or adjusted under 35 U.S.C. 154(b) by 85 days.

(21) Appl. No.: 14/100,757

(22) Filed: Dec. 9, 2013

(65) Prior Publication Data

US 2014/0096632 A1   Apr. 10, 2014

Related U.S. Application Data

(63) Continuation of application No. PCT/EP2012/060091, filed on May 30, 2012.

(30) Foreign Application Priority Data

Jun. 15, 2011  (EP) ..................................... 11169909

(51) Int. Cl.
| | |
|---|---|
| *F16H 57/02* | (2012.01) |
| *H01F 21/12* | (2006.01) |
| *H01H 19/00* | (2006.01) |
| *F16H 1/20* | (2006.01) |

(Continued)

(52) U.S. Cl.
CPC . *F16H 1/20* (2013.01); *H01H 3/40* (2013.01); *H01H 3/44* (2013.01); *H01H 9/0027* (2013.01); *F16H 27/06* (2013.01); *H01F 29/04* (2013.01); *Y10T 74/19642* (2015.01)

(58) Field of Classification Search
CPC ..... H01H 9/0005; H01H 9/0016; H01H 9/48; H01H 9/0027; H01H 50/10; F16H 1/20; F16H 27/06; F16H 29/04; Y10T 74/19642; H01F 29/04
USPC ...... 74/412 R; 336/150, 138, 149; 200/11 TC
See application file for complete search history.

(56) References Cited

U.S. PATENT DOCUMENTS 3,472,981 A * 10/1969 Urbanek et al. .............. 218/118

FOREIGN PATENT DOCUMENTS

| CH | 231975 A | 4/1944 |
|---|---|---|
| EP | 0116748 A1 | 8/1984 |
| GB | 662499 A | 12/1951 |

OTHER PUBLICATIONS

International Search Report and Written Opinion of the International Searching Authority Application No. PCT/EP2012/060091 Completed: Aug. 21, 2012; Mailing Date: Sep. 3, 2012 9 pages.

*Primary Examiner* — Mangtin Lian
(74) *Attorney, Agent, or Firm* — Whitmyer IP Group LLC

(57) ABSTRACT

A gearbox for a tap changer. The gearbox has an input drive shaft arranged to be connected to a motor. The gearbox also has a diverter switch drive output with a diverter shaft. The diverter switch drive output is arranged to be connected for actuation of breakers in a diverter switch of the tap changer. The gearbox further has first and second selector arm drive outputs arranged for actuation of a tap selector of the tap changer. It also has reduction gear means connecting the input drive shaft to the diverter switch drive output and to each of the selector arm drive outputs. Further the gearbox has timing connection means arranged to connect the reduction gear means to each of the selector arm drive outputs. The invention also relates to a tap changer having such a gearbox and to a transformer provided with such a tap changer.

15 Claims, 5 Drawing Sheets

(51) Int. Cl.
  *H01H 3/40* (2006.01)
  *H01H 3/44* (2006.01)
  *H01H 9/00* (2006.01)
  *F16H 27/06* (2006.01)
  *H01F 29/04* (2006.01)

GEARBOX FOR A TAP CHANGER, A TAP CHANGER AND A TRANSFORMER

FIELD OF THE INVENTION

The present invention relates to a gearbox for a tap changer, which gearbox has an input drive shaft arranged to be connected to a motor and includes a diverter switch drive output with a diverter shaft, which diverter switch drive output is arranged to be connected for actuation of breakers in a diverter switch of the tap changer.

The invention also relates to a tap changer and to a transformer.

BACKGROUND OF THE INVENTION

A tap changer is commonly used in connection with a transformer in order to vary the transformation rate thereof. In a transformer with a tap changer one of the windings in the transformer has a fixed amount of turns connected to the circuit. The other winding has one fixed connection point, whereas the other connection point can be selected among a number of points to attain a required voltage. The selectable points may be located after each other along a portion of the winding corresponding to 70% to 100% of its full extension.

Upon a change in the load connected to the transformer or due to other influences it might be required to change the connection point. The need of changing the tap point is often triggered automatically in response to sensed parameters. Tap changing includes a plurality of manoeuvres including the opening and closing of switches e.g. via a spring loaded energy accumulator and moving a selector arm to a new connection point. These manoeuvres have to be performed in a certain sequence and in a certain time relation.

The driving and transmission devices for this therefore tend to be quite circumstantial and complicated.

SUMMARY OF THE INVENTION

One object of the present invention is to provide a simple and reliable way of attaining a drive of a tap changer.

This object is according to the invention achieved in that a gearbox of the kind specified in the introduction of this description has the specific features that the gearbox further includes first and second selector arm drive outputs, arranged for actuation of a tap selector of the tap changer, reduction gear means connecting the input drive shaft to the diverter switch drive output and to each of the selector arm drive outputs and timing connection means arranged to connect the reduction gear means to each of the selector arm outputs.

By using one single gearbox that from one and the same driving source converts the movement to those necessary for actuating the switches via a spring loaded energy accumulator and to those necessary for actuating the selector arms at a specific time relation, the gearbox is multifunctional. Such a gearbox replaces a plurality of devices for achieving the same function and leads to a compact construction. Since the movement conversions and the timing will be closely related in the invented gearbox, the complete operation cycle becomes safe and secure.

According to a preferred embodiment of the invention, the gearbox is arranged such that a plurality of revolutions of the input drive shaft completes one operation cycle for the tap changer, during which operation cycle the diverter switch drive output rotates 150° to 180°, and during which operation cycle in a first mode one of the selector arm outputs rotates an angle in the range of 90° to 180°, which rotation occurs during a fraction of the operation cycle and the other is stationary, and during which operation cycle in a second mode both the selector arm outputs are stationary, whereby the first mode represents that the input drive shaft rotates in the same direction as in the nearest preceding operation cycle, and the second mode represents that the input drive shaft rotates in the opposite direction as in the nearest preceding operation cycle.

This reduction of the drive rotation is appropriate for on the one hand providing a slow tensioning of the spring in the energy accumulator and also for the selector arm actuation. The rotation of the diverter switch drive output of 180° or slightly less makes it possible to arrange for a simple and reliable mechanism for the tensioning of the spring. Through the specified timing and duration of the selector arm drive outputs, movement of the required selector arm will be adapted to the actuation of the breakers in the diverter switch. Preferably the rotation angle of the selector arm outputs is 90°, 120° or 180°.

When a selector arm is to be moved to a new contact point, it is moved to the adjacent contact point in either of two directions. The direction of the required movement determines the rotational direction of the input drive shaft in response to the command given to it. This direction can either be the same as the nearest preceding direction or opposite to it and represent the two specified modes. By the specified conditional arrangement of the selector arm drive outputs the gearbox in a simple way will be adapted to operate adequately in both cases.

According to a further preferred embodiment the mentioned fraction is within the range of 30% to 70% of the operation cycle, and the movement of the rotating selector arm drive output is completed before the rotation of the selector arm drive output is completed.

An extension of the fraction within that range is particularly suitable for an adequate time relation to the actuation of the diverter switch. By completing the selector arm movement before the charging of the diverter switch spring is completed, it is assured that the selector arm is in the right position in due time.

According to a further preferred embodiment the number of revolutions of the drive input shaft for one operation cycle is within the range of 3 to 10, and the rotational speed of the input drive shaft is 0.5 to 2 revolutions per sec.

These ranges specify suitable data with regards to appropriate values for the gear reduction rate, the required drive power, the moments etc. Preferably the number of revolutions is 4 to 6, in particular 5. Preferably the rotational speed of the input shaft is 0.8 to 1, 3 revolutions per sec, in particular 1 revolution per sec.

According to a further preferred embodiment, the reduction gear means includes a gear reduction set that is common for all three drive outputs.

This contributes to further simplify the construction of the gearbox and is practical, since optimized rotational speed of the various drive outputs require a reduction of about the same level. With this arrangement also the synchronisation of the drive outputs becomes precise.

According to a further preferred embodiment the gear reduction set connects the input drive shaft to the diverter shaft, and the diverter shaft has a conditional driving connection to each of the selector arm drive outputs.

This central localisation of the gear reduction set also enhances the simplicity and accuracy of the gearbox.

According to a further preferred embodiment, the conditional driving connection includes a Geneva wheel mechanism.

The specific function of a Geneva wheel mechanism is particularly suitable for achieving an intermittent and synchronized drive output of the kind that is required for the two selector arm drive outputs.

According to a further preferred embodiment, the conditional driving connection to each selector arm drive output includes a driving arm mounted on a Geneva drive shaft, which Geneva drive shaft each has a drive connection to the diverter shaft and which driving arm each drives a respective Geneva wheel.

A simple and reliable connection thereby is established between the diverter shaft and the Geneva wheels of the selector arm drive outputs.

According to a further preferred embodiment, the drive connection between the Geneva drive shafts and the diverter shaft includes a driving wheel on the diverter shaft and a driven wheel connected to both the Geneva drive shafts and which driving wheel and driven wheel have perpendicular axes.

A driving wheel that is common for both the Geneva drive shafts means that the behaviour of the selector arm drive outputs relative to each other will be well defined in a simple way. By the crossing axes arrangement the selector arm drive outputs will be perpendicular to the diverter switch drive output, which is an advantageous adaption to the localisation and positions of the units that are to be actuated. This also contributes to achieve a compact construction of the gearbox.

According to a further preferred embodiment, each driving arm is mounted on its respective Geneva drive shaft by means of a freewheeling mechanism, allowing relative rotation a certain angle, which angle is in the range of 120° to 180°.

A specific moving pattern of the selector arm outputs in relation to each other and in relation to the diverter switch drive output and with respect to the rotational direction of the input drive shaft can be attained in an easy and precise way by this freewheeling. The specified range for the angle is adapted to that. Preferably the angle is in the range of 140° to 160°, and most preferably around 150°. The freewheeling may advantageously be accomplished in that the Geneva drive shaft has a basic radius and a portion which projects outside this radius over a certain angle, and that the driving arm has an opening for the shaft that partly has a radius that corresponds to the basic radius of the shaft and partly is wide enough to receive the projecting portion of the shaft, which latter part of the opening has an angular extension that is larger than the angular extension of the projecting portion of the shaft with an amount that is the same as the specified angle.

According to a further preferred embodiment, the gearbox further includes a gearbox drive output arranged to be connectable to another gearbox of similar kind, which gearbox drive output is arranged to rotate at the same speed as the input drive shaft.

For a multi-phase application, e.g. three-phase, this embodiment simplifies the drive system since one and the same driving source can be used for all the gearboxes for the phases. The driving source can be connected to a first of the gearboxes and the other can be consecutively connected to the first gearbox. Preferably the input drive shaft and the gearbox drive output have the axes in the same direction. Particularly preferred is that they are aligned, and they may thereby be made as one single shaft projecting out from opposite sides of the gearbox.

According to a further preferred embodiment, the axis of the diverter switch drive output is perpendicular to the axis of the input drive shaft, and the axes of the two selector arm drive outputs are aligned with each other and parallel to the axis of the input drive shaft.

This orientation of the axes relative to each other results in a compact construction of the gearbox and is well adapted to the actuation functions that are to be performed. This orientation also facilitates to arrange the gearing mechanisms in the gearbox rationally.

The invention also relates to a tap changer provided with at least one gearbox according to the invention, in particular to any of the preferred embodiments thereof.

According to a preferred embodiment of the invented tap changer, it is arranged for multi-phase application and includes a plurality of gearboxes according to the invention.

The invention also relates to a transformer provided with a tap changer according to the invention.

The invented tap changer and the invented transformer gain from the advantages of the invented gearbox and the preferred embodiments thereof, and which advantages have been described above.

While the above described preferred embodiments of the invention are specified, it is to be understood that further preferred embodiments of course can be constituted by any possible combination of the preferred embodiments above and by any possible combination of these and features mentioned in the description of examples below.

The invention will be further explained through the following detailed description of examples thereof and with reference to the accompanying drawings.

DETAILED DESCRIPTION OF THE INVENTION

Figure 1:
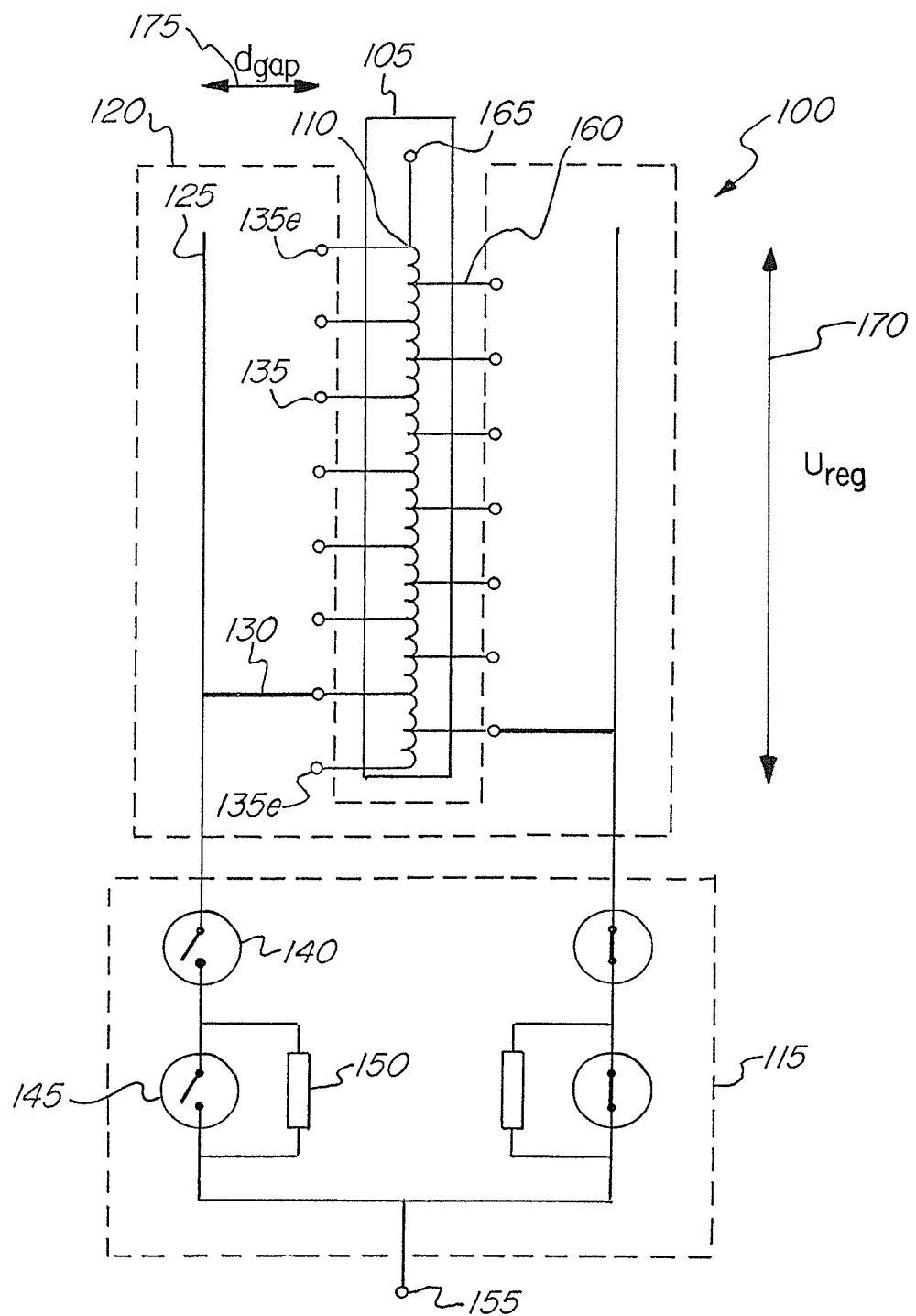
FIG. 1 is an illustration of a tap changer of a kind for which the gearbox of the present invention is suitable.

FIG. 1 schematically illustrates a tap changer 100 of a kind for which the gearbox according to the present invention is intended. The tap changer 100 is connected to a regulating winding 105 of a transformer and has a set of different taps 110. The tap changer of FIG. 1 is of diverter switch type, and comprises a diverter switch 115 and a tap selector 120.

The tap selector 120 of FIG. 1 comprises two current collectors 125, two selector arms forming two moveable contacts 130 and further comprises a set of fixed contacts 135, where, each fixed contact 135 is arranged to be connected to one of the taps 110 of the regulating winding. The tap changer 100 of FIG. 1 has fifteen different fixed contacts 135, and the regulating winding 105 has fifteen taps 110. The tap changer 100 of FIG. 1 is mechanically linear in the sense that the current collectors 125 are implemented as linear rods, and the fixed contacts 135 are arranged in a linear fashion. The two current collectors 125 together form a current collector part.

The diverter switch 115 comprises two series connections of a main contact 140 and a transition contact 145, with transition resistor 150 connected in parallel with transition contact 145. It is common that the contacts are vacuum interrupters. Each of the series connections are, at one end, connected to a respective one of the two current collectors 125, and, at the other end, connected to an external contact 155 of the tap changer 100.

The movable contacts 130 are, at one end, in electrical contact with a respective one of the current collectors 125. A selector arm 130 can move along the current collector 125 to which it is connected, in order to reach different positions, at which the other end of the movable contact 130 is in electrical contact with one of the fixed contacts 135. The moveable contacts 130 could for example be sliding contacts arranged to slide along the current collectors 125, to allow for electrical connection between the current collectors 125 and the different fixed contacts 135. The driving of the moveable contacts 130 of FIG. 1 is arranged so that if one of the moveable contacts 130 is in contact with a fixed contact 135, connected to a first tap, the other moveable contact 130 is in contact with a fixed contact 135, connected to a tap 110 which is adjacent to the first tap 110.

By switching the main contacts 140 and transition contacts 145 in a conventional manner, one or the other of the moveable contacts 130 will be in electrical contact with the external contact 155, and thus provide an electrical path through the tap changer 100. Similarly, the two current collectors 125 will take turns at being part of the electrical path of the tap changer 100. The electrical path through the tap changer 100 ends at the external contact 155 at one end, and at the fixed contact 135 that is currently connected at the other end. An example of a diverter switch 115 is described in EP0116748. The diverter switch 115 of FIG. 1 is an example only, and any suitable type of diverter switch 115 can be used.

As mentioned above, the regulating winding 105 has a set of taps 110, which are shown to be connected to the fixed contacts 135 of the tap changer 100 via cables 160. The other end of the regulating winding 105 is provided with an external contact 165. Depending on which tap 110 is currently connected to a fixed contact 135, the electrical path between the external contacts 155 and 165 will include a different number of the regulating winding turns. The regulating winding 105 is often not seen as part of the tap changer 100, and has therefore been surrounded by a solid line in FIG. 1.

When it is required to change from one tap to another, the vacuum interruptors of the contacts 140 and 145 and those on the other current collector are to be closed and opened, respectively in a certain sequence. This allows the selector arms with the movable contacts 130 to move to come into contact with the adjacent one of the fixed contacts 135. Closing and opening of the vacuum interrupters in the diverter switch 115 and movement of the movable contacts in the tap selector 170 has to be made in a certain time relation to each other. The actuation of the vacuum interrupters requires a rapid and strong actuation force, that normally is obtained by an energy accumulator having a spring that can be charged and discharged.

The gear box according to the present invention has the function to provide mechanical power for actuating the vacuum interrupters via the energy accumulator and for moving the contacts. The aspects of a tap changer described above are generally known and are mainly for the purpose of explaining the context in which the invented gearbox operates.

Figure 2:
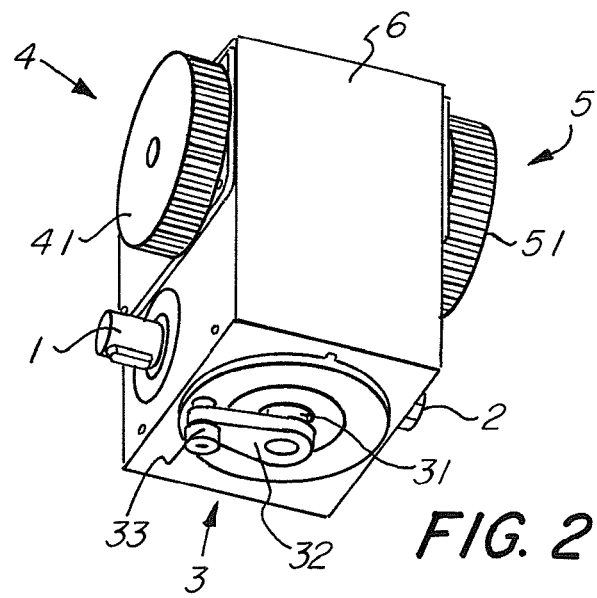
FIG. 2 is a perspective view of a gearbox according to the invention.

FIG. 2 in a perspective view illustrates a gearbox according to the present invention. The gearbox has an input drive shaft 1 connectable to a drive motor (not shown). Via various gear mechanism inside the housing 6 of the gearbox the input drive shaft is in drive connection with four mechanical drive outputs. A gearbox drive output 2 is a shaft that is arranged to be connected to the input drive shaft 1a, 1b of a similar gearbox for another phase (see FIG. 9). A diverter switch drive output 3 is located on the bottom side of the gearbox and is arranged to be in drive connection with an energy accumulator (not shown) in order to charge the spring therein for the actuation of the vacuum breakers. Further, two selector arm drive outputs 4, 5 are arranged on opposite sides of the gearbox for actuating a respective movable contact of the tap changer.

The diverter switch drive output 3 has a diverter shaft 31 that is perpendicular to the input drive shaft 1 and rotates at a reduced speed in relation thereto. At the outer end of the shaft there is a crank arm 32 fixed to the diverter shaft 31 and extending perpendicular thereto. The arm 32 at its outer end is provided with a pin 33 which acts on the energy accumulator. The spring of the energy accumulator is fully charged when the arm has rotated 180°. The full charging occurs already at about a rotation of 150° of the arm.

Each of the two selector arm drive outputs 4, 5 has a respective driving wheel 41, 51 that by a belt (not shown) is connected to the respective selector arm. These drive wheels 41, 51 are in parallel to the input drive shaft 1. Also these drive wheels 41, 51 rotate at reduced speed in relation to the input drive shaft 1, and they rotate intermittently and conditionally.

The drive wheels 41, 51 may be configured as toothed gears as shown in the FIGS. for cooperation with a respective tooth belt. Alternatively the drive wheels may be configured with other kinds of gripping projections or recesses for cooperation with a complementary shaped belt.

The gearbox thus contains various gear means for providing the pattern of movements mentioned above including reduction gears and timing mechanisms. In the following an example of the construction of the gearbox will be explained more in detail with reference to FIGS. 3-6.

Figure 3:
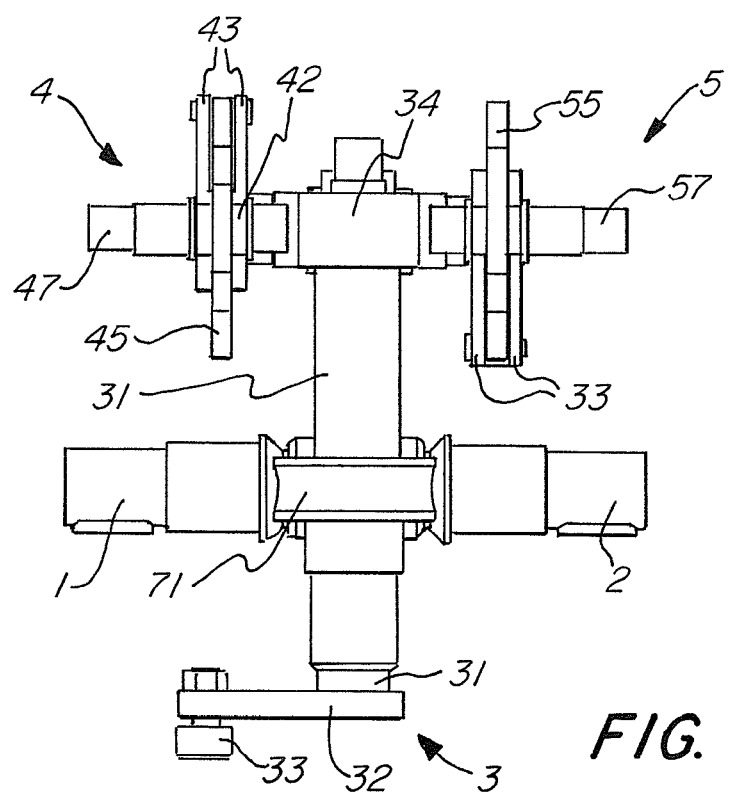
FIG. 3 in a side view illustrates some of the gearing details in the gearbox of FIG. 2.
Figure 4:
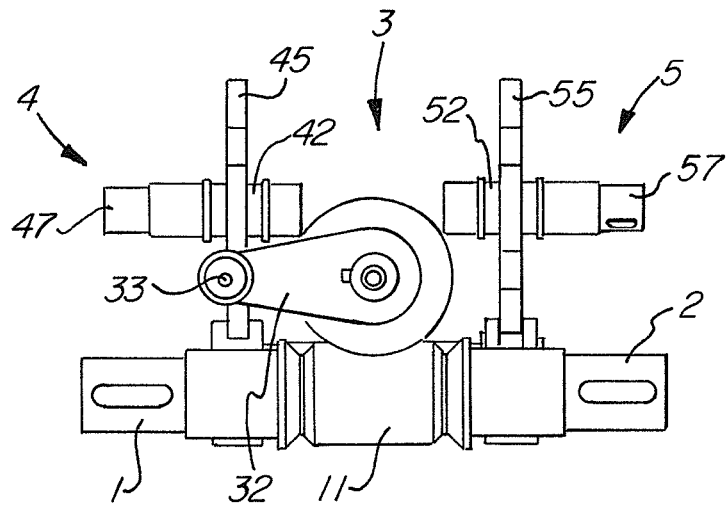
FIG. 4 is a view from the bottom side of FIG. 3.

FIG. 3 is a side view of the essential parts of the gear mechanism in the gear box. The input drive shaft 1 is rigidly connected to the shaft 2 of the gearbox drive output thus resulting in a 1:1-relation. The common shaft thus formed by these shafts 1, 2 has a worm 11 (not shown in this FIG., see FIG. 4). The worm 11 meshes with a worm wheel 71 arranged on the diverter shaft 31. The gear ratio of the worm gear mechanism is 10:1. This requires the input drive shaft 1 to rotate 5 complete turns in order to achieve a rotation of 180° of the crank arm 32 attached to the outer end of the diverter shaft 31.

At the other end of the diverter shaft 31 there is a helical gear wheel 34 in mesh with a corresponding helical gear wheel (not visible in the FIGS.), which latter has an axis perpendicular to the axis of the diverter shaft 31 and thus is in parallel with the input drive shaft 1. The helical gearwheels have a gear ratio of 1:1. The direction of the teeth in the two helical gears wheels is such that the driven wheel will rotate in the opposite direction as the input drive shaft 1. The driven gear wheel drives a Geneva wheel connected to the selector arm drive outputs 4, 5.

Figure 5:
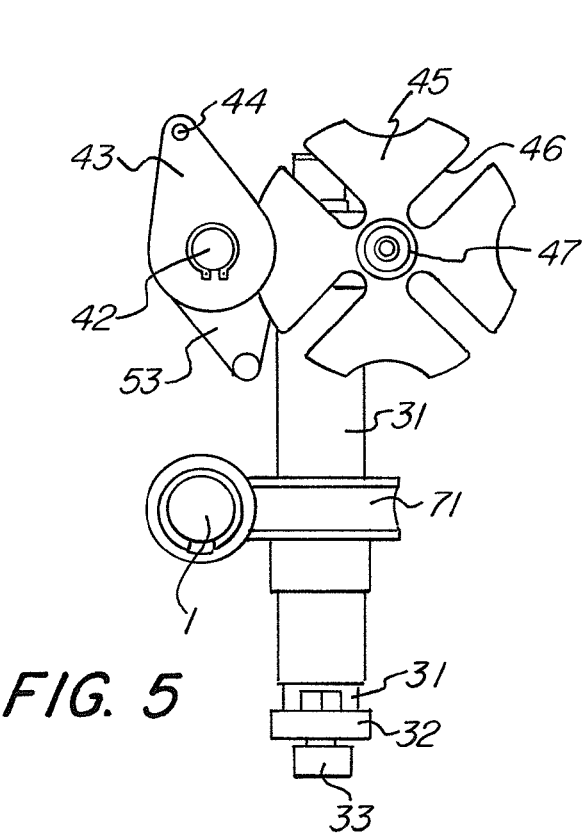
FIG. 5 is a view from the left side of FIG. 3.
Figure 6:
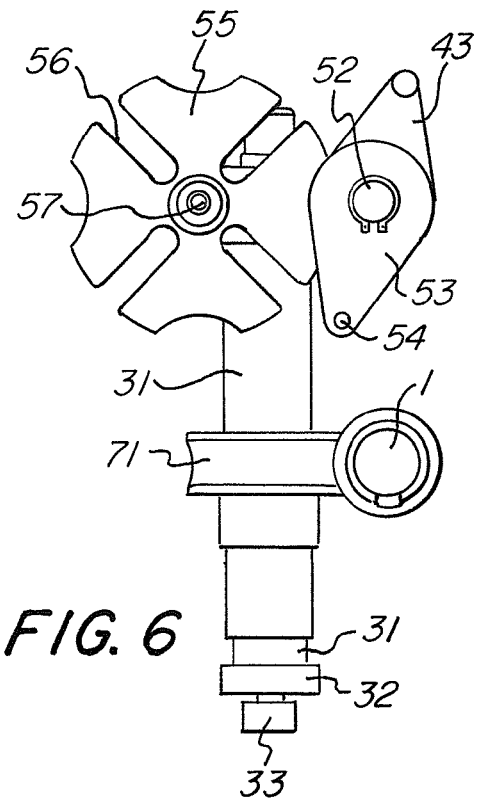
FIG. 6 is a view from the right side of FIG. 3.

This is best illustrated in FIG. 5 and 6, where FIG. 5 is a view from the left side of FIG. 3, and FIG. 6 from the right side. In FIG. 5 it is shown a driving arm 43 of the Geneva mechanism. This driving arm 43 is conditionally rotating connected to the driven helical wheel through the shaft 42. The drive connection between the shaft 42 and the driving arm 43 will be further explained below with reference to FIG. 7. The driving arm 43 consists of two similar parts with an interspace between each other, and of which one is located behind the other in this figure. At the outer end of the driving arm 43 its two parts are joined together by a driving pin 44. The driving pin 44 meshes with the grooves 46 in the Geneva wheel 45 such that rotation of the driving arm 43 will rotate the Geneva wheel intermittently and in the opposite direction in a well known manner. The interspace between the parts of the driving arm 43 is large enough for the Geneva wheel to rotate between them. The corresponding driving arm 53 on the other side is also visible in the figure.

The operation of the other Geneva mechanism on the opposite side of the gear box is illustrated in FIG. 6 and is similar to that described next above.

Each Geneva wheel 45, 55 is by a shaft connection 47, 57 drivingly connected to the respective gear wheel 41, 51 shown in FIG. 2.

Figure 7:
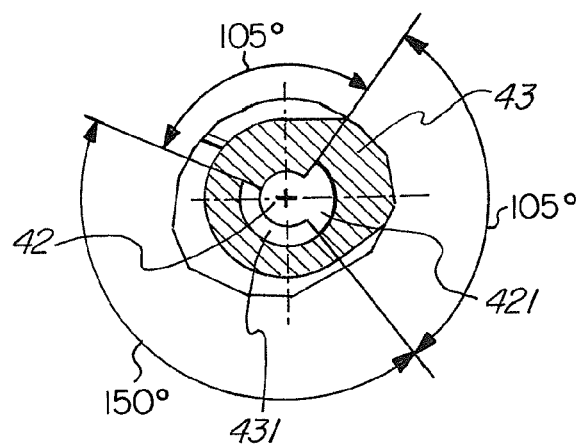
FIG. 7 is an enlarged cross section through a detail of FIG. 3.

FIG. 7 is a section through the inner portion of the driving arm 43. It has a central opening 431 through which the shaft 42 extends. The opening 431 has a portion with a smaller radius and a portion with a larger radius. The shaft 42 in the region where it meshes with the driving arm 43 correspondingly has a mesh part 421 with a smaller and a larger radius corresponding to those of opening 431. In this example the angular extension of the portion with the smaller radius of the opening 431 is 105° and the extension of the portion with the larger radius is 255°. The portion of the mesh part 421 with the smaller radius extends angularly over 255° and thus the portion with the larger radius over 105°.

Thereby is achieved that when the shaft 42 starts to rotate in the clockwise direction from the position shown in the FIG., it will not affect the driving arm 43 until it has rotated 150°. After that the large portion of the mesh part will come into driving contact with the driving arm 43. If the shaft 42 starts to rotate in the counter clockwise direction from the shown position it will immediately cause the driving arm 43 to rotate.

Also the shaft 52 connected to the selector arm drive output 5 on the opposite side has a similar connection to its driving arm 53. The angular position of the mesh part 421 of the shaft 42 has a certain angular relation to the corresponding mesh part of shaft 52 in order to attain the required timing of the selector arm drive outputs 4, 5.

The above described gearing mechanisms result in predetermined drive outputs in a predetermined sequence. When the input drive shaft 1 is arranged to make five revolutions for an operation of the tap changer the following outputs will occur:

The shaft of the gearbox drive output 2 will make five revolutions and transmit the movement to the gearbox of another phase. The rotational direction is the same as that for the input drive shaft 1.

The diverter shaft 31 with the crank arm 32 of the second drive output 3 will rotate 180° and charge the spring for actuating the vacuum breakers. The rotational direction will be either clockwise or counter clockwise depending on the rotational direction of the input drive gear 1.

Each drive wheel 41, 51 of the selector arm drive outputs 4, 5, respectively will rotate conditionally due to the Geneva mechanism, either 0° or 90°, to move a respective selector arm.

The rotational direction of the input drive shaft 1 depends on in which direction the tap changing is to be performed. The conditional rotations of the drive wheels 41, 51 depend on the rotational direction of the input drive shaft 1, and if this is the same or opposite to the nearest preceding operation.

When the input drive shaft 1 rotates in a direction that is the same as in the nearest preceding operation, the left drive wheel 41 will rotate 90° and the right drive wheel 51 will stand still. If the input drive shaft 1 in the next operation still rotates in the same direction, the right drive wheel 51 will rotate 90° and the left drive wheel 41 stand still.

When the input drive shaft 1 rotates in the opposite direction to the direction of the nearest preceding operation, both the drive wheels 41, 51 will stand still.

Figure 8:
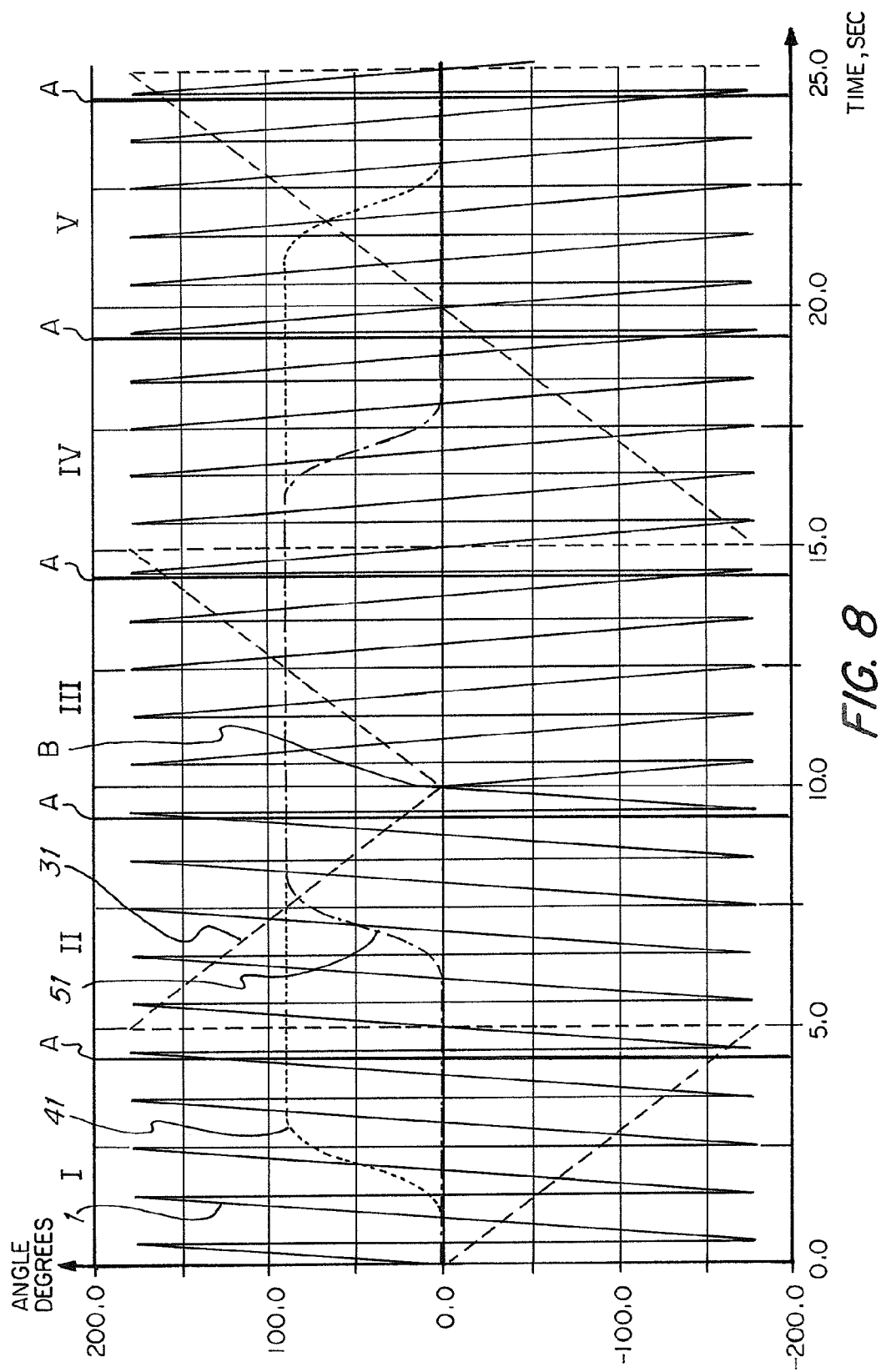
FIG. 8 is a time/angle diagram illustrating the movements of some of the components illustrated in FIG. 3.

In a typical application the input drive shaft rotates at a speed of 1 revolution/sec. FIG. 8 in a time diagram illustrates the time relationships of the movements and shows five consecutive operations I to V. The graphs represent the input drive shaft 1, the diverter axis 31, the left drive wheel 41 and the right drive wheel 51 and are denoted the respective reference number. The releases of the spring for the diverter switch 115 are indicated as A and occur almost instantly. In the diagram the movement of a component reaching +180° is illustrated to continue from the −180° side of the diagram.

In the diagram it can be seen that during operation I, from 0 sec. to 5 sec. the input drive shaft 1 rotates five complete revolutions, during which time the diverter shaft 31 rotates to the position −180°. The spring release A occurs short before that position is reached. After about 1 sec. the left drive wheel 41 starts to rotate and has completed its 90° movement after about 3 sec. The right drive wheel 51 stands still at its 0° position. The selector arm driven by the left drive wheel 41 thus has been moved before the spring release.

During operation II, from 5 sec. to 10 sec. the input drive shaft 1 rotates in the same direction and thereby also the diverter shaft 31. The left drive wheel 41 stands still at its 90° position, whereas the right gear wheel 51 rotates 90°. The rotations of the drive wheels 41, 51 are sinusoidal in the diagram due to the Geneva drive of these.

During operation III the input drive shaft 1 operates in the opposite direction. The change of direction can be seen in point B in the diagram. As can be seen the diverter shaft 31 consequently also will change rotational direction. Both the drive wheels 41, 51 stand still maintained at their respective 90° position. The rotational direction of the input drive shaft 1 for operations IV and V is the same as that of operation III. The behaviour of the other components is according to the principle described for operation I and II, but they will of course rotate in the opposite directions to those of operation I and II as illustrated in the diagram.

Figure 9:
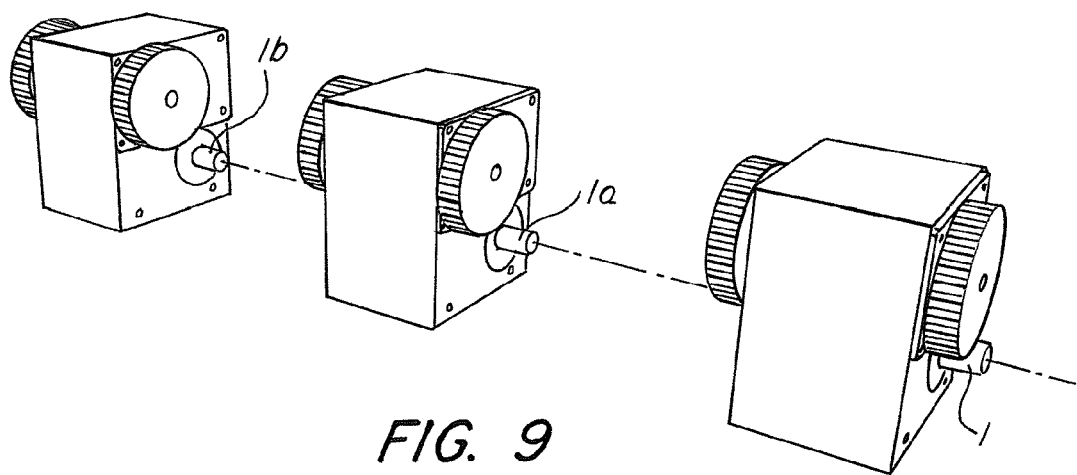
FIG. 9 is a perspective view illustrating the connection between three gearboxes according to the invention.

FIG. 9 illustrates an arrangement with three gearboxes according to the invention for operation in a three phase application. The input drive shaft 1, 1a, 1b for each of the gearboxes can be seen at the respective right side of them. On the opposite side the respective drive outputs 2 are coaxially located (not visible in the FIG.). The input drive shaft 1 of the gearbox to the right is connected to a motor, whereas the input drive shafts 1a, 1b of the other two are drivingly connected to the respective drive output of the neighbouring gearbox.

What is claimed is:

1. A gearbox for a tap changer, which gearbox has an input drive shaft arranged to be connected to a motor and includes a diverter switch drive output with a diverter shaft, which diverter switch drive output is arranged to be connected for actuation of breakers in a diverter switch of the tap changer, characterized in that the gearbox further includes first and second selector arm drive outputs, arranged for actuation of a tap selector of the tap changer, reduction gear means connecting the input drive shaft to the diverter switch drive output and to each of the selector arm drive outputs timing connection means arranged to connect the reduction gear means to each of the selector arm outputs, wherein the gearbox is arranged such that a plurality of revolutions of the input drive shaft completes one operation cycle for the tap changer, during which operation cycle the diverter switch drive output rotates 150° to 180°, and during which operation cycle in a first mode one of the selector arm outputs rotates an angle in the range of 90° to 180°, which rotation occurs during a fraction of the operation cycle and the other is stationary, and during which operation cycle in a second mode both the selector arm outputs are stationary, whereby the first mode represents that the input drive shaft rotates in the same direction as in the nearest preceding operation cycle, and the second mode represents that the input drive shaft rotates in the opposite direction as in the nearest preceding operation cycle.

2. The gearbox according to claim 1, characterized in that said fraction is within the range of 30% to 70% of the operation cycle, and in that the movement of the rotating selector arm drive output is completed before the rotation of the selector switch drive output is completed.

3. The gearbox according to claim 1, characterized in that said plurality of revolutions is in the range of 3 to 10 and that the rotational speed of the input drive shaft is 0,5 to 2 revolutions per sec.

4. The gearbox according to claim 1, characterized in that the reduction gear means includes a gear reduction set that is common for all three said drive outputs.

5. The gearbox according to claim 4, characterized in that the gear reduction set connects the input drive shaft to the diverter shaft and in that the diverter shaft has a conditional driving connection to each of the selector arm drive outputs.

6. The gearbox according to claim 5, characterized in that the conditional driving connection includes a Geneva wheel mechanism.

7. The gearbox according to claim 6, characterized in that the conditional driving connection to each selector arm drive output includes a driving arm mounted on a Geneva drive shaft, which Geneva drive shaft each has a drive connection to the diverter shaft and which driving arm each drives a respective Geneva wheel.

8. The gearbox according to claim 7, characterized in that said drive connection between the Geneva drive shafts and the diverter shaft includes a driving wheel on the diverter shaft and a driven wheel connected to both the Geneva drive shafts and which driving wheel and driven wheel have perpendicular axes.

9. The gearbox according to claim 5, characterized in that the each driving arm is mounted on its respective Geneva drive shaft by means of a freewheeling mechanism, allowing a relative rotation a certain angle, which angle is in the range of 120° to 180°.

10. The gearbox according to claim 1, characterized in that the gearbox further includes a gearbox drive output arranged to be connectable to another gearbox of similar kind, which gearbox drive output is arranged to rotate at the same speed as the input drive shaft.

11. The gearbox according to claim 1, characterized in that the diverter switch drive output includes a crank arm connected to the diverter axis.

12. The gearbox according to claim 1, characterized in that the axis of the diverter switch drive output is perpendicular to the axis of the input drive shaft, that the axes of the two selector arm drive outputs are aligned with each other and parallel to the axis of the input drive shaft.

13. A tap changer, characterized in that the tap charger includes at least one gearbox according to claim 1.

14. A tap changer, characterized in that the tap changer is arranged for a multiphase application and includes a plurality of gearboxes according to claim 1, of which at least all except one includes a gearbox drive output connecting one gearbox to the input drive shaft of another gearbox.

15. A transformer, characterized in that the transformer includes a tap changer according to claim 13.

* * * * *